Oct. 19, 1971   HISAO HASEGAWA ET AL   3,613,398
CONSTANT VELOCITY BALL JOINT
Filed Oct. 6, 1969                        3 Sheets-Sheet 1

HISAO HASEGAWA,
& MASASHI SANAMI
INVENTORS

BY

ATTORNEY

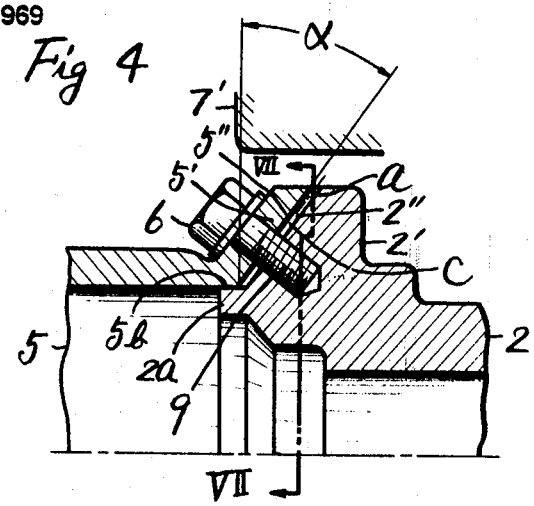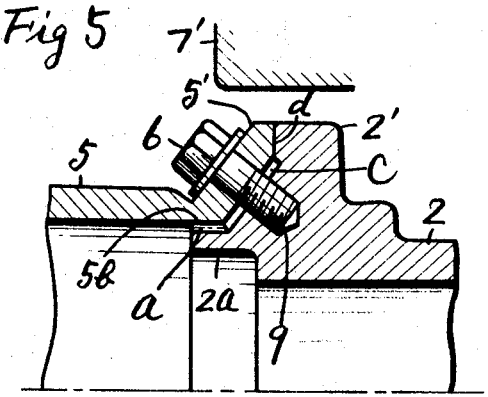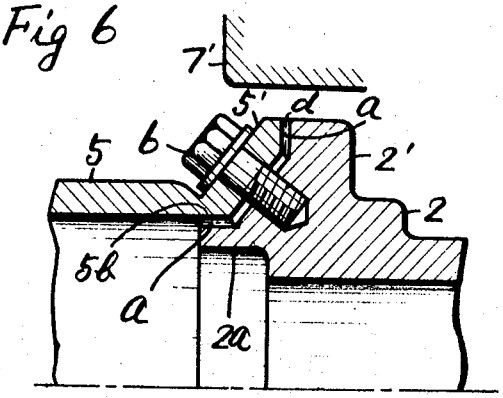

United States Patent Office 3,613,398
Patented Oct. 19, 1971

3,613,398
CONSTANT VELOCITY BALL JOINT
Hisao Hasegawa, Nagoya, and Masashi Sanami, Takarazuka, Japan, assignors to Toyo Bearing Manufacturing Company Limited, Osaka, Japan
Filed Oct. 6, 1969, Ser. No. 863,845
Int. Cl. F16d 3/30
U.S. Cl. 64—21                                    4 Claims

ABSTRACT OF THE DISCLOSURE

In a universal joint comprising inner and outer members coupled rotationally by torque transmitting balls, the outer member has a conical flange portion, an attaching member for securing the outer member to one of the drive members has a conical flange portion fitting therewith, clamp bolts secure said flange portions together, and the outer member and attaching member further have radial interengaging spline means cooperating to avoid exertion of shearing force in the bolts during driving of the joint.

---

The invention will be described with reference to the accompanying drawings, in which:

FIG. 4 is an enlarged view of the principal portion of the structure shown in FIG. 2;

FIGS. 5 and 6 show other embodiments of the invention;

Figure 1:
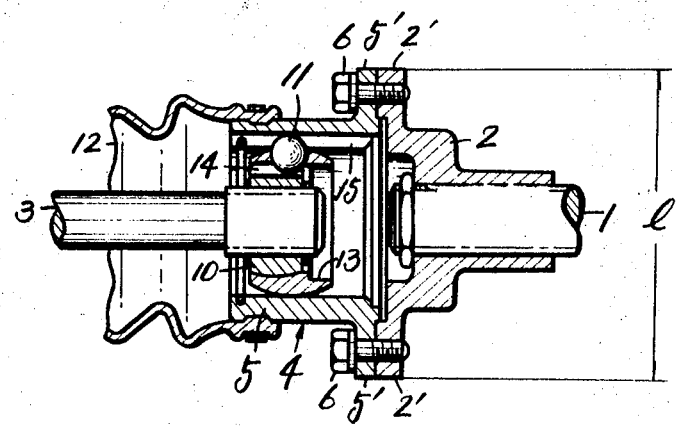
FIGS. 1 and 2 are front longitudinal sections of constant velocity ball joint attachment parts, FIG. 1 showing a conventional structure and FIG. 2 an improved structure according to the invention, FIGS. 1 and 2 both being taken along line I—I in FIG. 3.

The invention provides an improved constant velocity ball joint wherein the overlap flange portions 2' and 5' respectively of a flange 2 rigidly secured to a driving shaft 1 and an outer ring 5 for a joint 4 are inclined at a predetermined angle $\alpha$ with respect to a plane which is orthogonal with respect to the axial direction, and clamp bolts 6 are screwed into the overlap flange portions 2' and 5' orthogonally with respect to the overlap surfaces.

Figure 8:
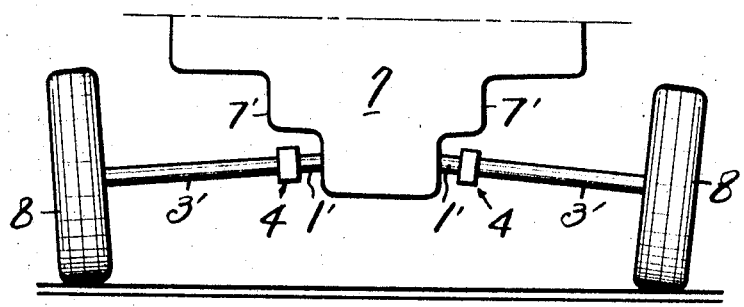
FIG. 8 is a view explanatory of the entire joint attachment part.

In a front wheel drive car and the like generally shown in FIG. 8, it is necessary that the output shafts 1' of a speed change gear 7 and the rotary shafts 3' of wheels 8 be interconnected with constant speed ball joints.

Conventionally, as shown in FIG. 1 the overlap flange portions 2' and 5' respectively of the flange 2 of the output shaft 1', i.e. driven shaft 1 and the outer ring 5 of the joint 4 have been outwardly projected orthogonally with respect to the axial direction and the clamp bolts 6 have been screwed into the overlap flange portions 2' and 5' in parallel with the axial direction. With such coupling structure, however, in the case of an inner joint as shown in FIG. 8, the presence of various parts including a speed change gear housing 7' constitutes an obstacle, which makes it necessary to expend much trouble on the insertion and tightening up of the clamp bolts 6. Further, if the overlap flange portions 2' and 5' respectively of the flange 2 and outer ring 5 are outwardly projected orthogonally with respect to the axial direction, the outer diameter $l$ of the overlap portions 2' and 5' becomes larger than is necessary, resulting in a case where they interfere with other parts to the extent that the attachment is impossible.

In view of the above-mentioned drawback inherent in the conventional designs, the present invention eliminates it and provides improvements. The improved arrangement will now be described in more detail with reference to the drawings.

Figure 2:
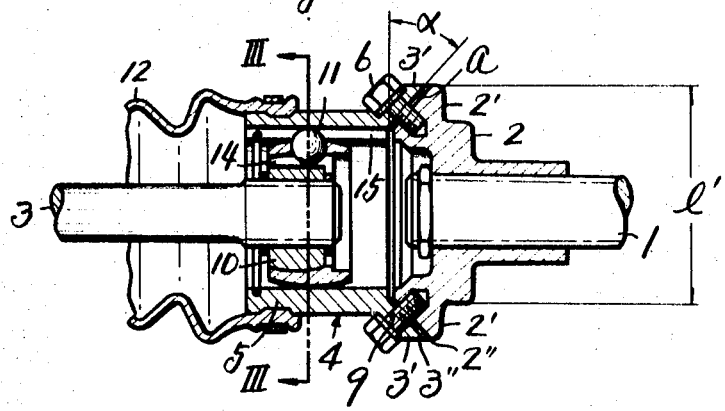

As shown in FIGS. 2 and 4, the overlap flange portion 5' of the outer ring 5 is directed toward the mating flange 2 and inclined at a predetermined angle $\alpha$ with respect to a plane which is orthogonal with respect to the axial direction. Further, the overlap flange portion 2' of the flange 2 is made thick-walled and its overlap surface 2" is formed so as to have such a diameter and inclination as agree with the mating overlap flange portion 5'. Bolt-fitting holes 9 are provided directed from the inclined back surface of the outer-ring flange portion 5' to the thick wall of the mating overlap flange 2' orthogonally with respect to the overlap surfaces. The clamp bolts 6 are screwed into the bolt-fitting holes 9 to interconnect the flange 2 on the driving side and the outer ring 5 on the driven side. As a result, the outer diameter $l$ of each overlap flange portion 2', 5' has become shorter by a size corresponding to the inclination $\alpha$. Further, the heads of the clamp bolts are directed slantingly toward the operator. Therefore, even if the attachment of the clamp bolts has to be operated in a narrow space as shown, the overlap flange portions 2' and 5' can be simply and easily installed without their bumping against the speed change gear housing 7' or other members, thus lessening the number of cases where it is found impossible to install them. Further, since the heads of the clamp bolts 6 are directed slantingly toward the operator, it becomes easier to engage a spanner with the bolt heads, and the driven shaft 3 and other members do not interfere with the turning of the spanner. Therefore, the clamp power drive at the time of the assembily becomes simple and easy and the adjustment can be made without difficulty, thus ensuring the easy and positive tightening up of the bolts 6.

As shown in FIG. 4, the outer marginal portions of the annular overlap surfaces 2" and 5" of the respective overlap flange portions 2' and 5' are formed with a number of radial cuts or splines $a$, and these cuts or splines $a$ on both surfaces are meshed with each other. Further, the inner marginal portion of the overlap flange portion 2' is formed with a short cylindrical stepped portion 2$a$ projecting therefrom so as to be fitted in the outer ring 5, and the bent corner portion 5$b$ of the mating overlap flange portion 5' is fitted on said stepped portion in surface contact relation. Either one of the overlap surfaces is formed with a clearance $c$ in the intermediate region thereof. With such structure, it is seen that during running at a lower rotative torque, such rotative torque is transmitted to the driven shaft 3 without exerting a high shearing force in the clamp bolts 6, as in the usual manner, while when a higher rotative torque is applied, a frictional resistance between the saw tooth-shaped cuts or splines $a$ acts so that rotary power transmission can be positively effected, avoiding exertion of shearing force in the clamp bolts 6 and thus rendering the latter durable.

Figure 3:
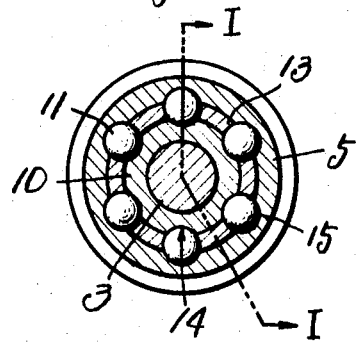
FIG. 3 is a section taken along line III—III in FIG. 2.
Figure 7:
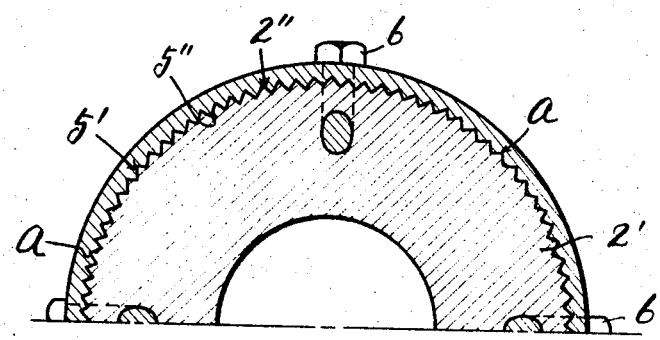
FIG. 7 is a section taken along line VII—VII in FIG. 4.

As shown in FIG. 5, if the fitting surfaces respectively of the stepped portion 2$a$ of the overlap flange portion 2' and the bent corner portion 5$b$ of the overlap flange portion 5' are provided with radial cuts or splines $a$ and are thus meshed with each other and the outer marginal portions of the overlap surfaces are bent as at $d$ symmetrically to the meshing surface (with the clamp bolt 6 as the axis of symmetry), then coupling having the same degree of safety as, or even a higher degree of safety than, in the case of FIG. 3 is achieved.

As shown in FIG. 6, even if the overlap surfaces at the bent portion $d$ and also the contact surfaces at the stepped portion 2$a$ and bent corner portion 5$b$ are formed with cuts or splines $a$ and are thus meshed with other, substantially the same function and effectiveness as in the case of FIGS. 4 and 5 are achieved. In addition, in FIGS. 1, 2 and 3, the numeral 10 designates an inner ring rigidly secured to the opposed end of the driven shaft 3; 11, a ball received in grooves 14 and 15 formed respectively in the inner and outer rings 10 and 5; 12, a cover sleeve; and 13, a retainer for the balls.

The rotation of the driving shaft 1 is transmitted at constant velocity through the flange 2, outer ring 5, balls 11 and inner ring 10 to the driven shaft 3 that can be universally angled, the flange 2, as shown in FIG. 2, being an attaching member for securing the ring or outer member 5 to the drive member 1.

As described above, since the present invention is so constructed that the overlap flange portions 2′ and 5′ respectively of a flange 2 rigidly secured to a driving shaft 2 and an outer ring 5 for a joint 4 installed on a driven shaft 3 are inclined at a predetermined angle α and clamp bolts 6 are screwed into the overlap flange portions 2′ and 5′ slantingly with respect to the axial direction, the outer diameter $l$ of the joint 4 can be made smaller and the attachment and detachment of the clamp bolts 6 can be easily effected.

Further, since either the overlap surfaces 2″, 5″ of the overlap flange portions 2′, 5′ or the contact surfaces of the stepped portion 2a and bent corner portion 5b, or both are provided with a number of cuts or splines a, a highly durable constant velocity ball joint is obtained wherein no shearing force acts on the clamp bolts 6 during transmission of power.

What is claimed is:

1. A universal joint for coupling together two drive members, said joint comprising, in combination:
  (a) inner and outer members coupled in the rotational sense by a plurality of torque transmitting balls between and interengaging with said members, said outer member having a conical flange portion thereon,
  (b) an attaching member for securing said outer member to one of said drive members, said attaching member having a conical flange portion thereon fitting the conical flange portion of said outer member,
  (c) clamp bolts screwed into the conical flange portions of said outer member and said attaching member for securing said flange portions together,
  (d) and said outer member and attaching member being provided with radial interengaging spline means affording a rotary driving connection therebetween for avoiding exertion of shearing force in the clamp bolts during driving of the joint.

2. A constant velocity ball joint wherein the overlap flange portions (2′) and (5′) respectively of a flange (2) rigidly secured to a driving shaft (1) and an outer ring (5) for a joint (4) installed on a driven shaft (3) are inclined at a predetermined angle (α) with respect to a plane which is orthogonal with respect to the axial direction, the outer marginal portions of the overlap surfaces (2″) and (5″) thereof are formed with a number of radial cuts or splines (a), the inner marginal portion of the overlap flange portion (2′) is formed with a short cylindrical stepped portion (2a), which is fitted in the outer ring (5) so as to be in surface contact with the bent corner portion (5b) of the mating overlap flange portion (5′), and clamp bolts (6) are screwed into the overlap flange portions (2′) and (5′) orthogonally with respect to the overlap surfaces.

3. A constant velocity ball joint wherein the overlap flange portion (2′) and (5′) respectively of a flange (2) rigidly secured to a driving shaft (1) and an outer ring (5) for a joint (4) installed on a driven shaft (3) are inclined at a predetermined angle (α) with respect to a plane which is orthogonal with respect to the axial direction, the outer marginal overlap surfaces of the overlap flange portions (2′) and (5′) are so formed as to coincide with planes which are orthogonal with respect to the axial direction so that the overlap surfaces are in surface contact with each other, the fitting contact surfaces respectively of the short cylindrical stepped portion (2a) formed at the inner marginal portion of the overlap flange portion (2′) and the bent corner portion (5b) of the mating overlap flange portion (5′) are formed with a number of cuts or splines extending in parallel with the shafts, and clamp bolts (6) are screwed into the overlap flange portions (2′) and (5′) orthogonally with respect to the overlap surfaces.

4. A constant velocity ball joint wherein the overlap flange portions (2′) and (5′) respectively of a flange (2) rigidly secured to a driving shaft (1) and an outer ring (5) for a joint (4) installed on a driven shaft (3) are inclined at a predetermined angle (α) with respect to a plane which is orthogonal with respect to the axial direction, the marginal overlap surfaces of the overlap flange portions (2′) and (5′) are so formed as to coincide with planes which are orthogonal with respect to the axial direction, both said overlap surfaces being formed with a number of radial cuts or splines (a), the fitting contact surfaces respectively of the short cylindrical stepped portion (2a) formed at the inner edge of the overlap flange portion (2′) and the bent corner portion (5b) of the mating overlap flange portion (5′) are formed with a number of cuts or splines (a) extending in parallel with the shafts, and clamp bolts (6) are screwed into the overlap flange portions (2′) and (5′) orthogonally with respect to the axial direction.

References Cited
UNITED STATES PATENTS

| | | | |
|---|---|---|---|
| 1,950,207 | 3/1934 | Anderson | 64—18 |
| 3,338,070 | 8/1967 | Scott | 64—21 |

MARK M. NEWMAN, Primary Examiner

R. HEALD, Assistant Examiner